United States Patent
Le Roux

(10) Patent No.: US 11,985,715 B2
(45) Date of Patent: May 14, 2024

(54) MANAGING METHOD FOR MANAGING THE CONNECTION OF A USER EQUIPMENT ITEM TO A DISTRIBUTED WIRELESS COMMUNICATION NETWORK

(71) Applicant: SAGEMCOM BROADBAND SAS, Rueil-Malmaison (FR)

(72) Inventor: Sylvain Le Roux, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 18/216,430

(22) Filed: Jun. 29, 2023

(65) Prior Publication Data
US 2024/0008105 A1 Jan. 4, 2024

(30) Foreign Application Priority Data

Jun. 30, 2022 (FR) ...................................... 2206689

(51) Int. Cl.
*H04W 4/00* (2018.01)
*H04W 76/10* (2018.01)
(Continued)

(52) U.S. Cl.
CPC ........... *H04W 76/10* (2018.02); *H04W 84/18* (2013.01); *H04W 88/085* (2013.01); *H04W 88/14* (2013.01)

(58) Field of Classification Search
CPC ... H04W 84/18; H04W 36/08; H04W 88/085; H04W 36/38; H04W 84/12
See application file for complete search history.

(56) References Cited

U.S. PATENT DOCUMENTS

| | | | |
|---|---|---|---|
| 6,975,865 B1* | 12/2005 | Vaisanen | H04W 16/16 455/450 |
| 2005/0138178 A1* | 6/2005 | Astarabadi | H04W 36/0085 709/227 |

(Continued)

FOREIGN PATENT DOCUMENTS

| | | | |
|---|---|---|---|
| FR | 3083409 A1 | 1/2020 | |
| FR | 3086826 A1 | 4/2020 | |
| FR | 3105681 A1 | 6/2021 | |

OTHER PUBLICATIONS

App. No. FR 2206689; Search Report and Written Opinion dated Feb. 10, 2023.

*Primary Examiner* — Omoniyi Obayanju
(74) *Attorney, Agent, or Firm* — MARSHALL, GERSTEIN & BORUN LLP

(57) ABSTRACT

This method for managing the connection of a user equipment item to a distributed wireless communication network includes the following steps: sorting access nodes of the distributed wireless communication network into different groups as a function of a primary indicator representative of their quality of connection to a distributed wireless communication network root node and, for at least one access node included in a selected group: determining a secondary indicator representative of a quality of connection of the user equipment item to the access node. If, for each access node included in the selected group, the secondary indicator is strictly greater than a threshold, the steps are repeated with another group containing access nodes having a lower quality of connection to the root node.

18 Claims, 12 Drawing Sheets

(51) Int. Cl.
*H04W 84/18* (2009.01)
*H04W 88/08* (2009.01)
*H04W 88/14* (2009.01)

(56) References Cited

U.S. PATENT DOCUMENTS

| | | |
|---|---|---|
| 2017/0135033 A1 | 5/2017 | Vecera et al. |
| 2020/0107231 A1 | 4/2020 | Le Roux |
| 2021/0194814 A1 | 6/2021 | Le Roux et al. |
| 2021/0250827 A1 | 8/2021 | Faye et al. |

* cited by examiner

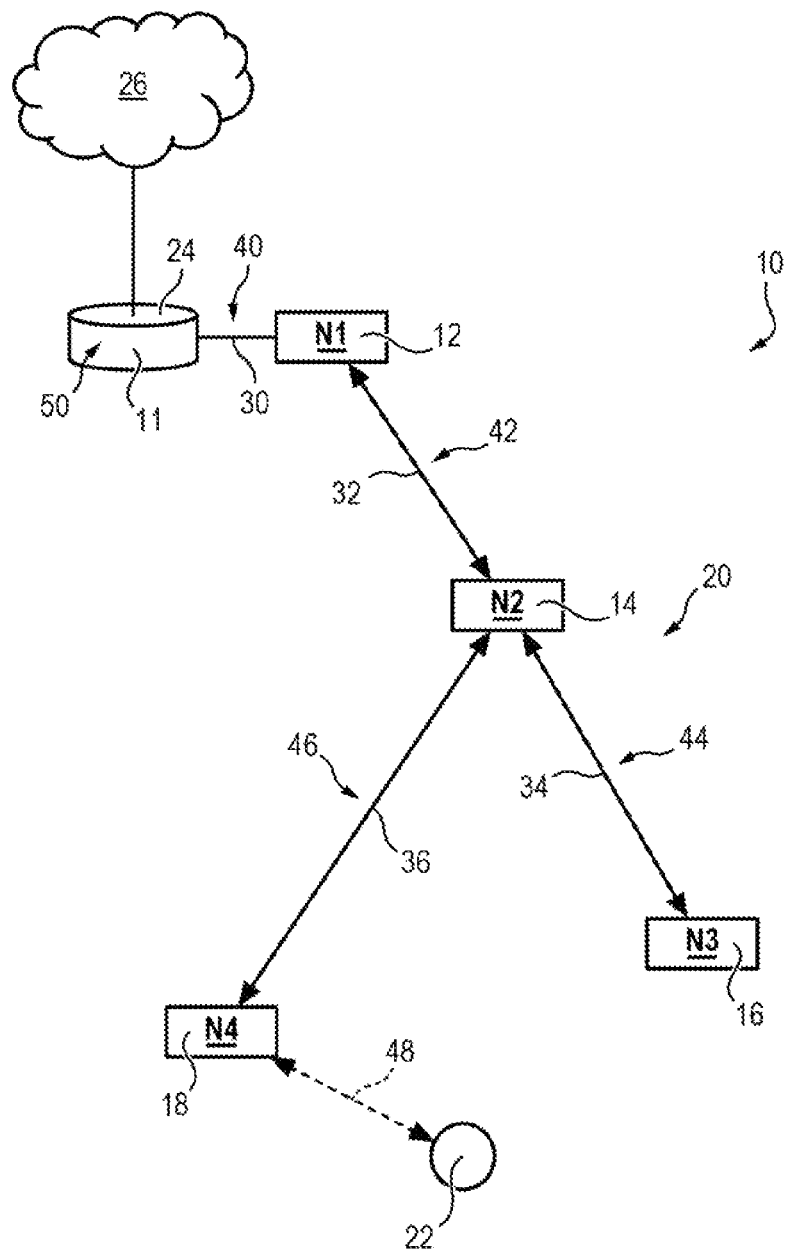
[Fig. 1]

[Fig. 2]
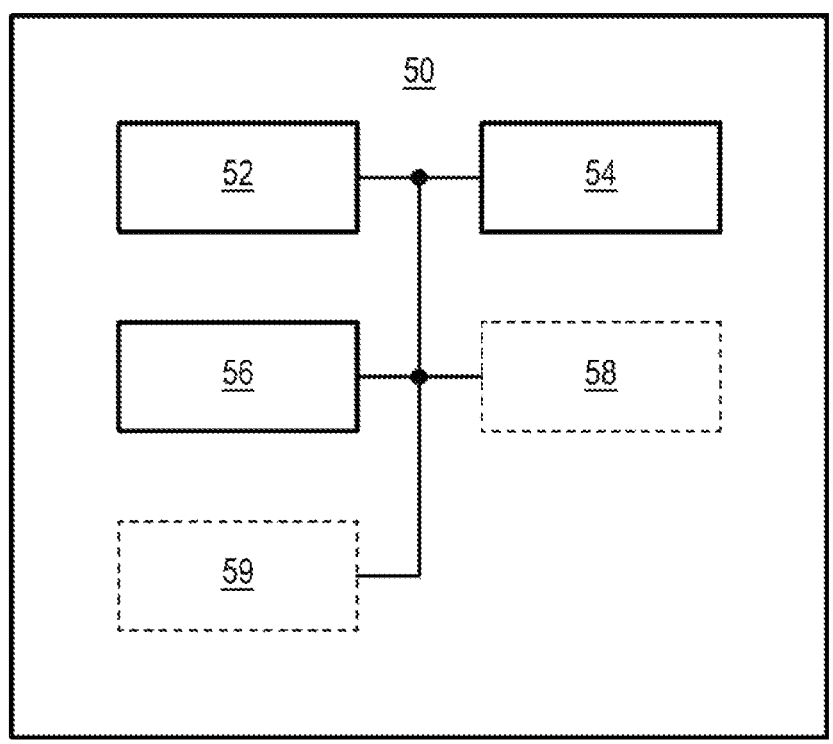

[Fig. 3]
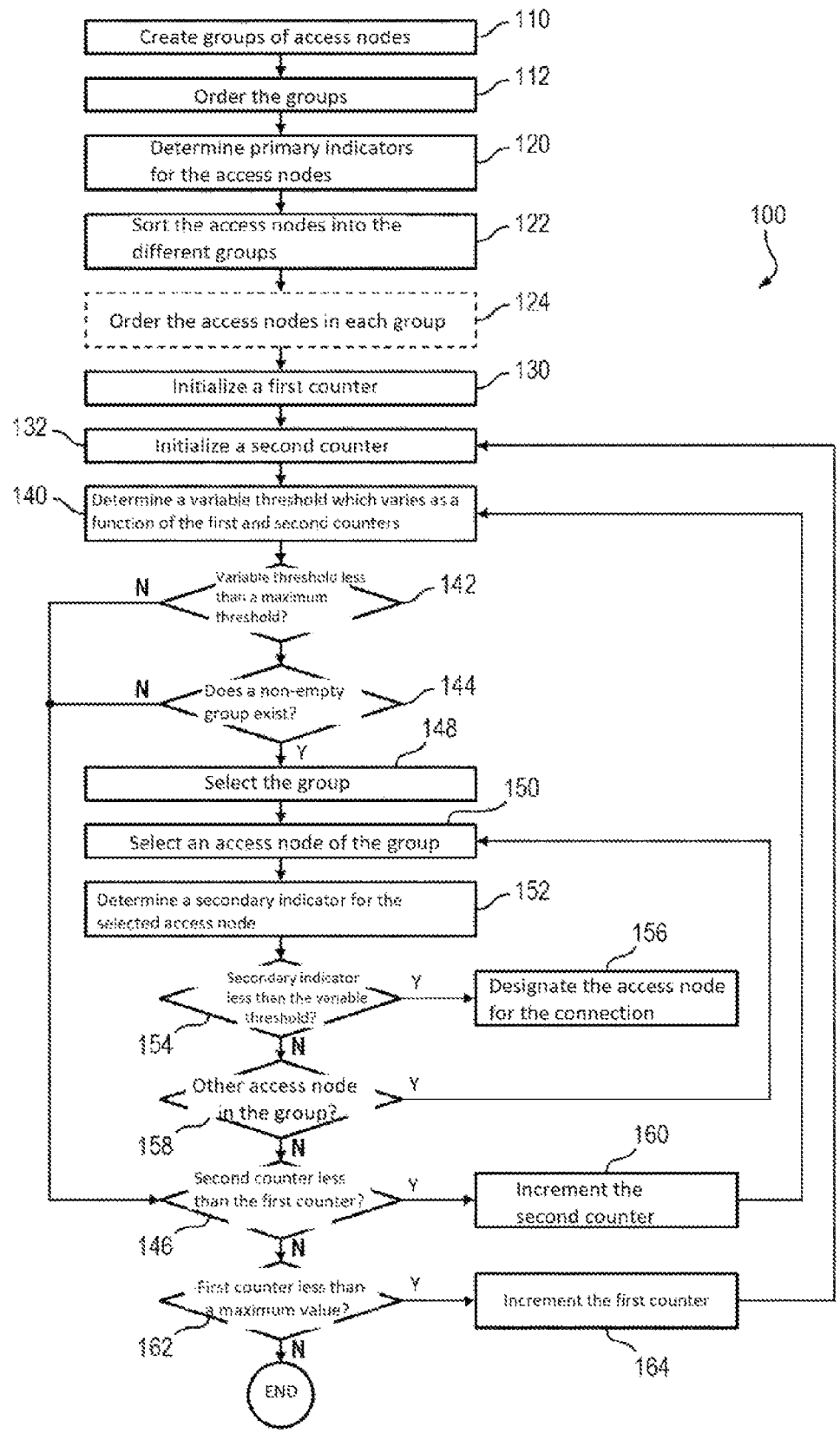

[Fig. 4]
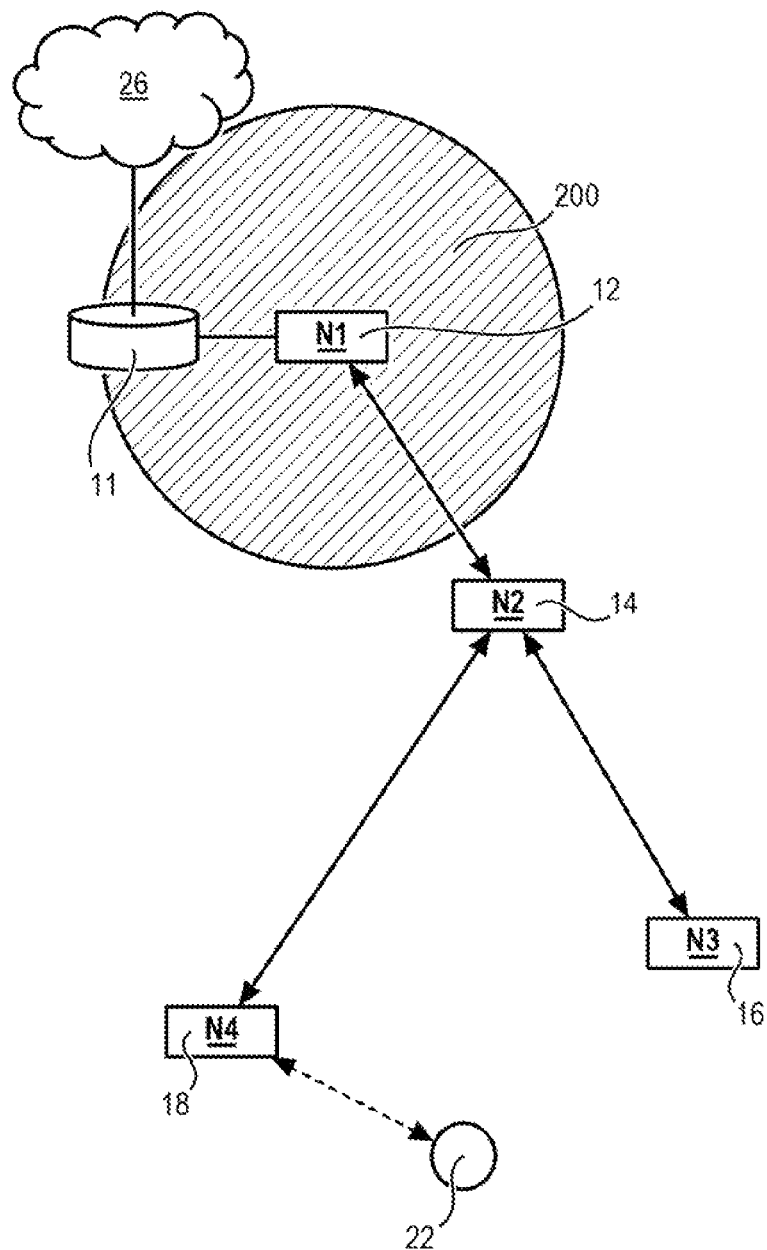

[Fig. 5]
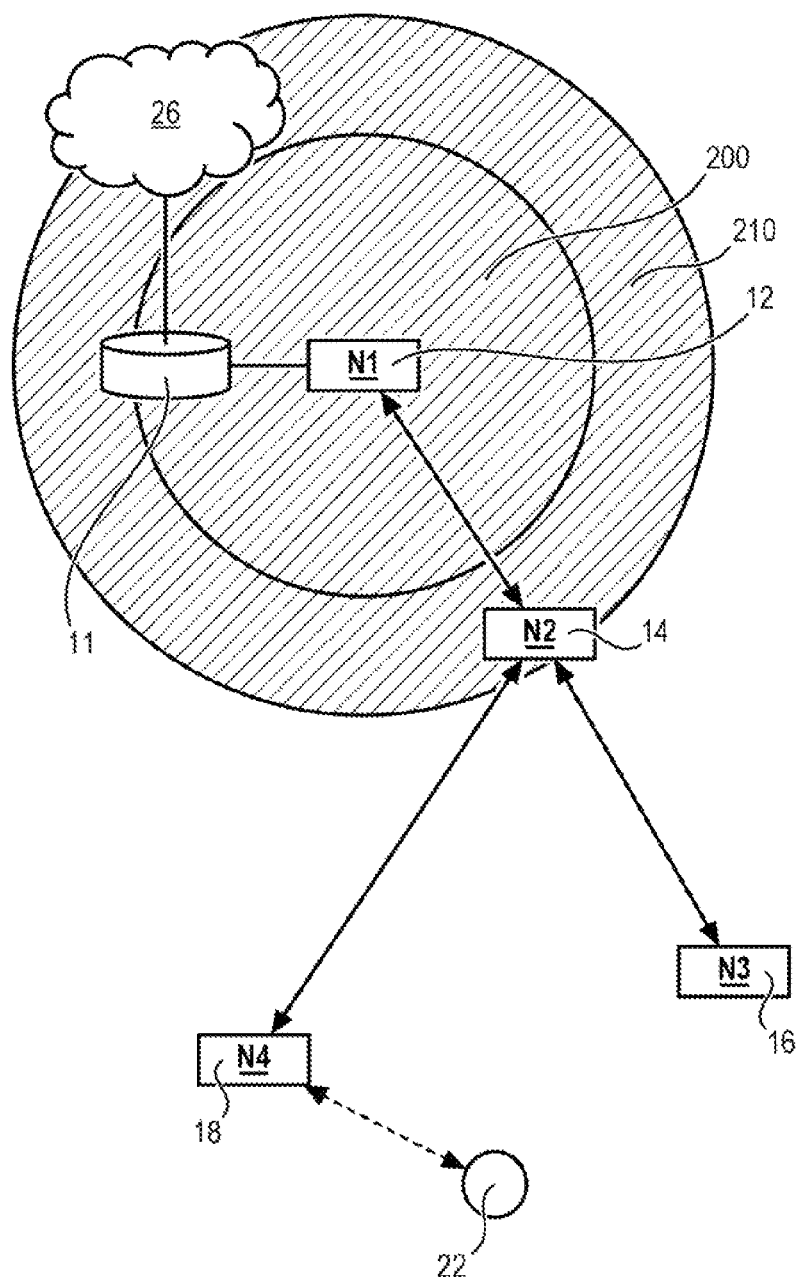

[Fig. 6]
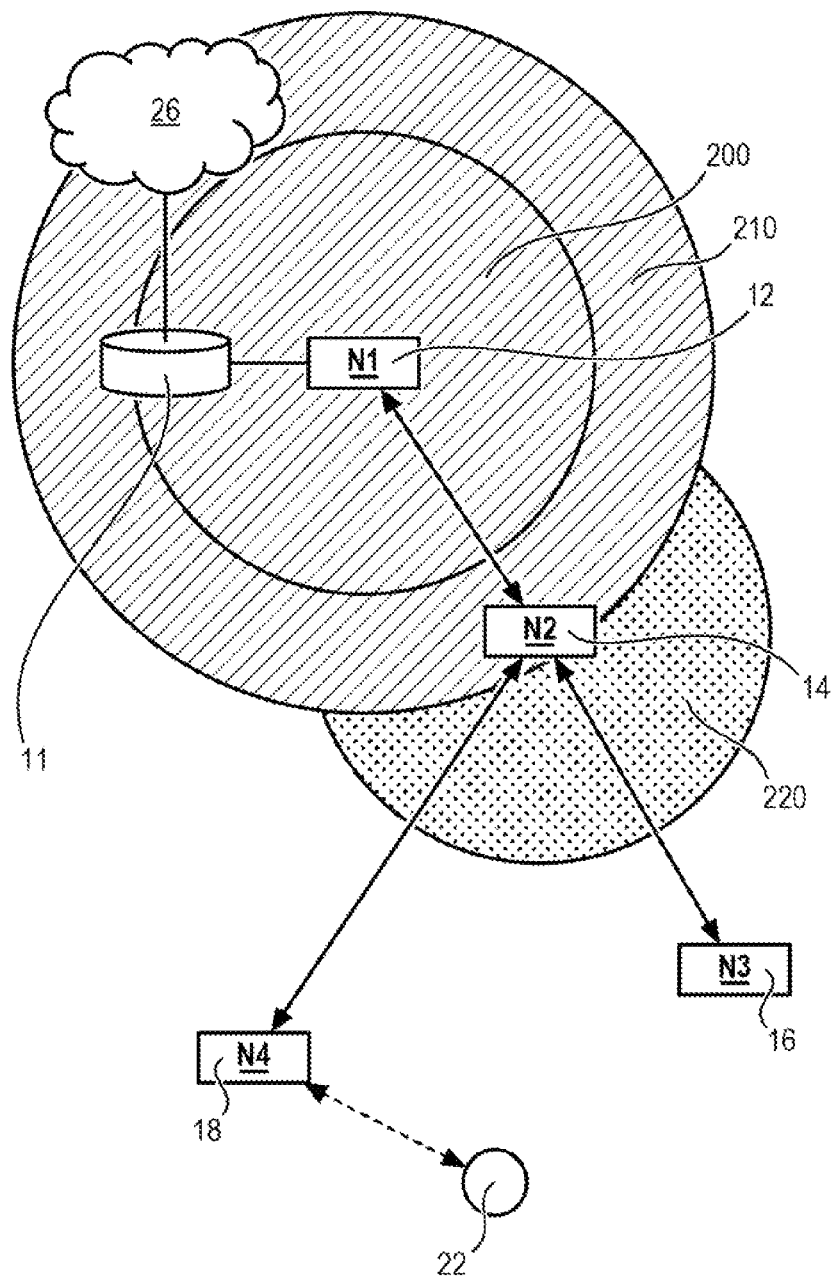

[Fig. 7]
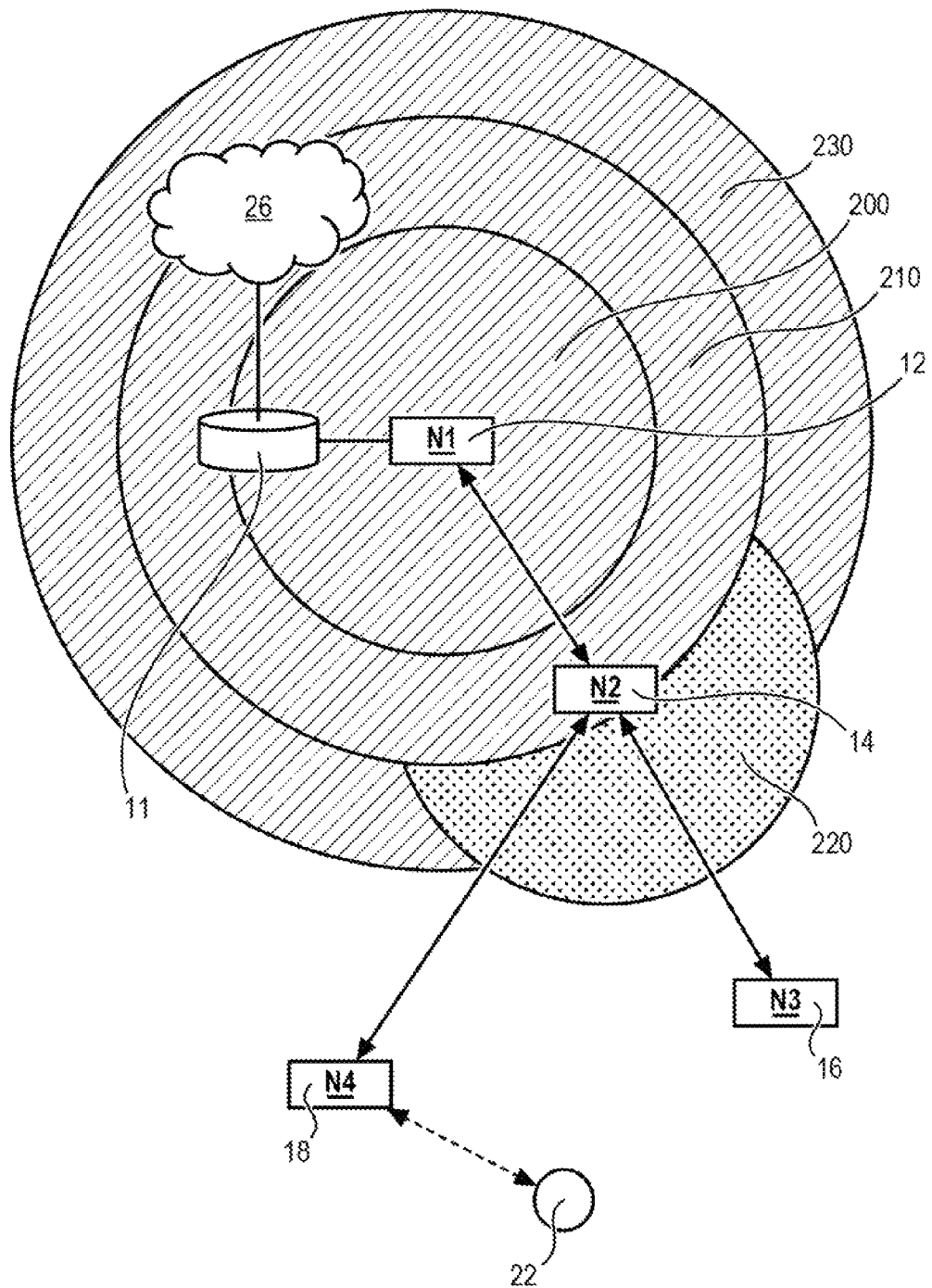

[Fig. 8]
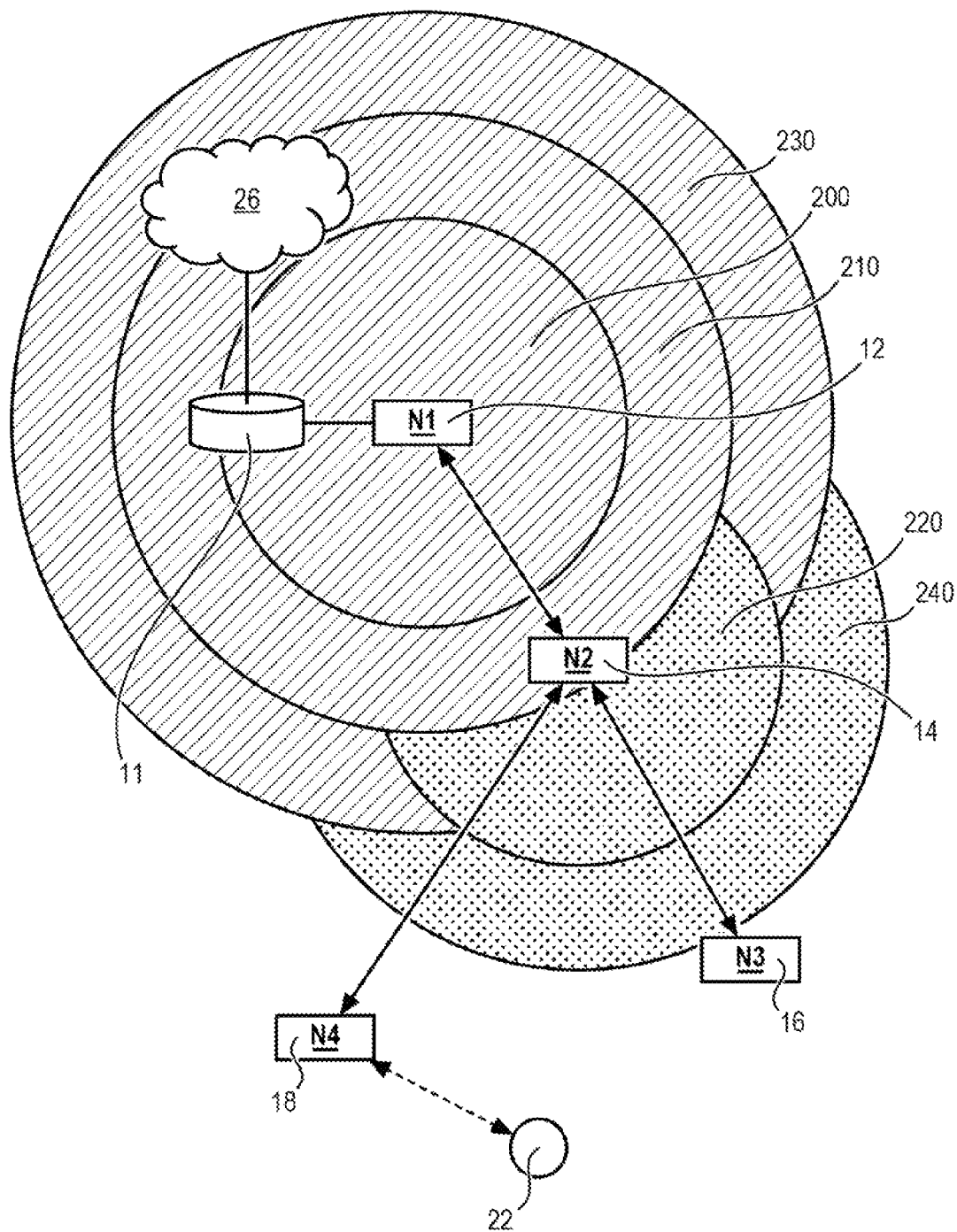

[Fig. 9]
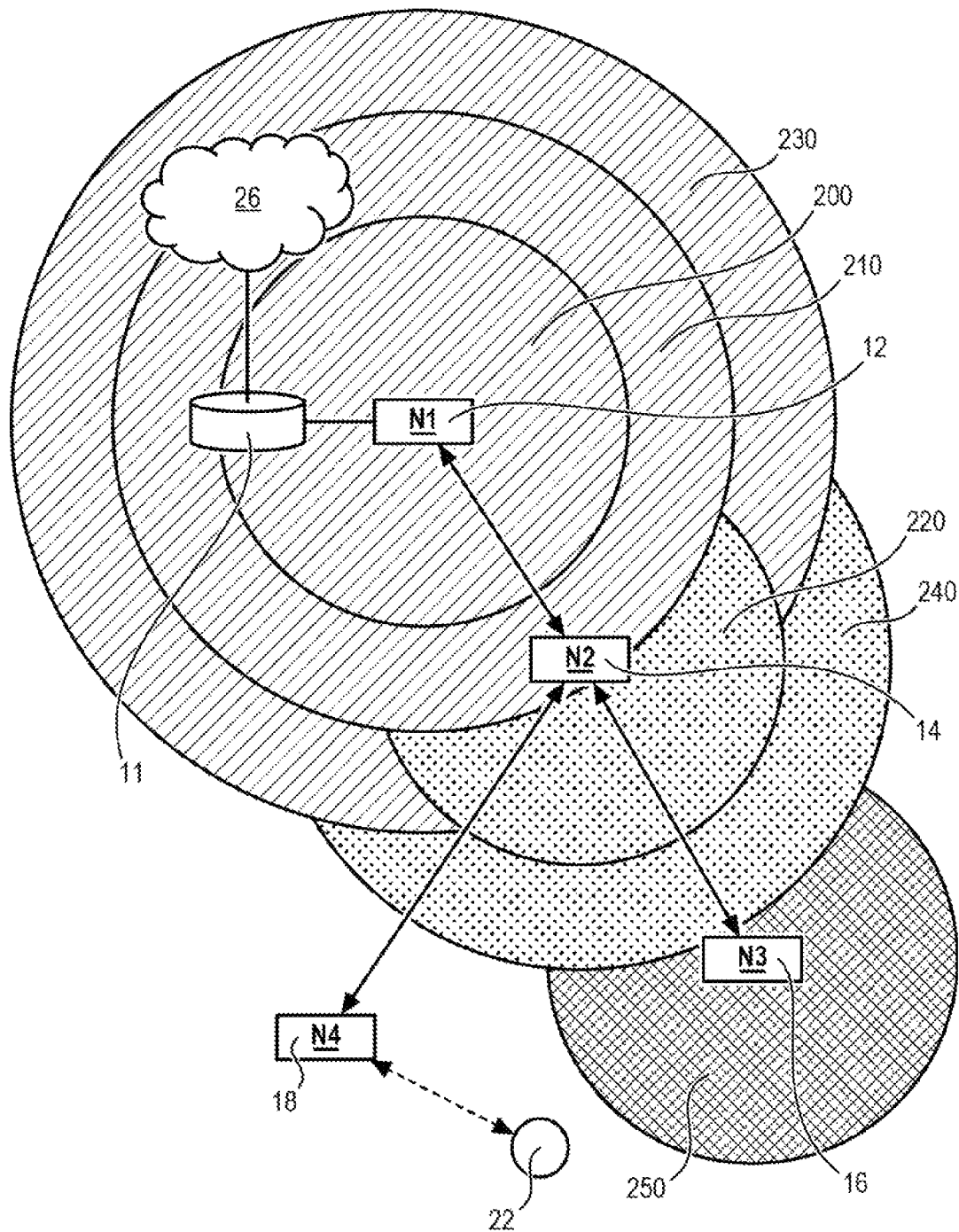

[Fig. 10]
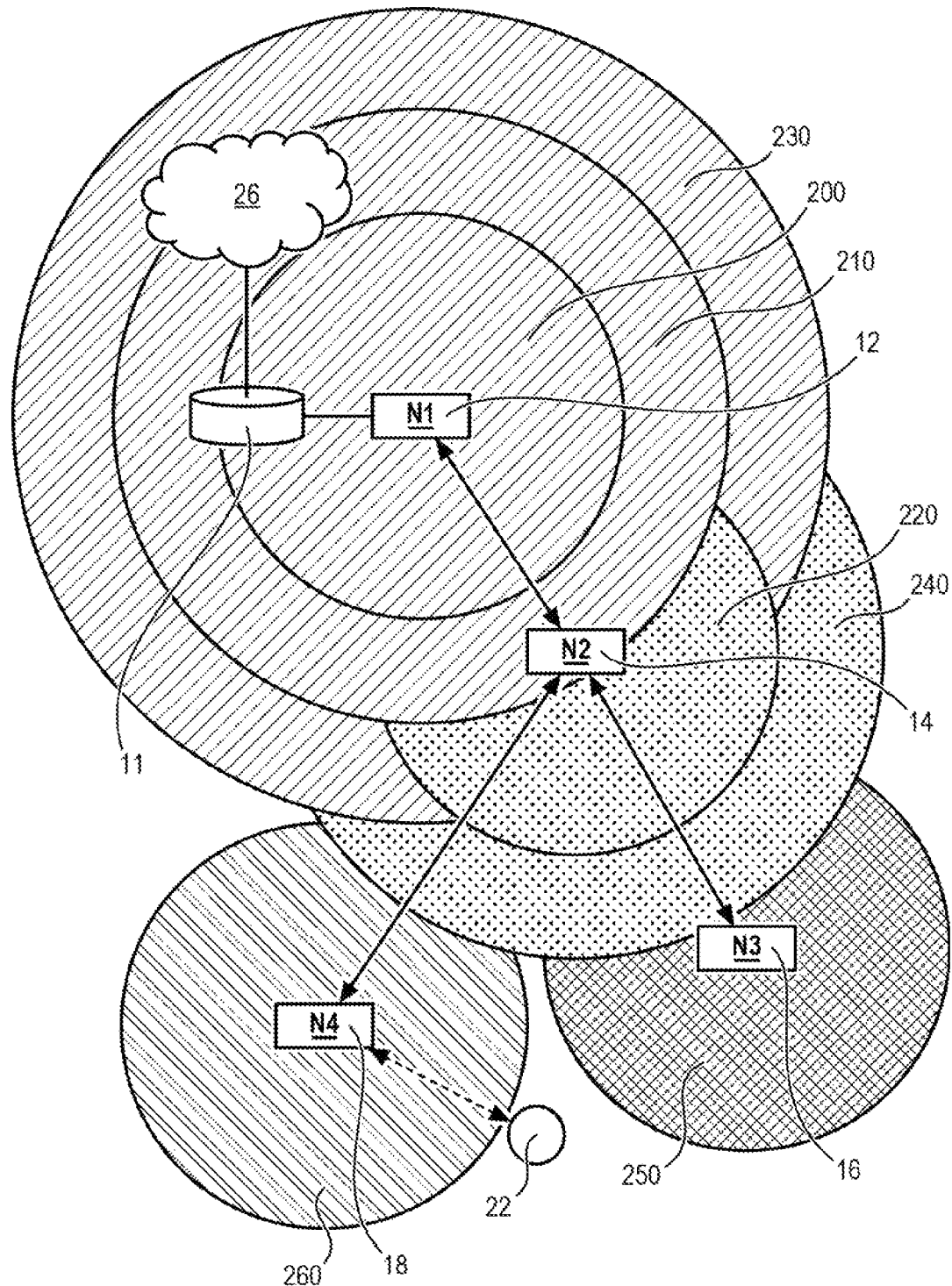

[Fig. 11]
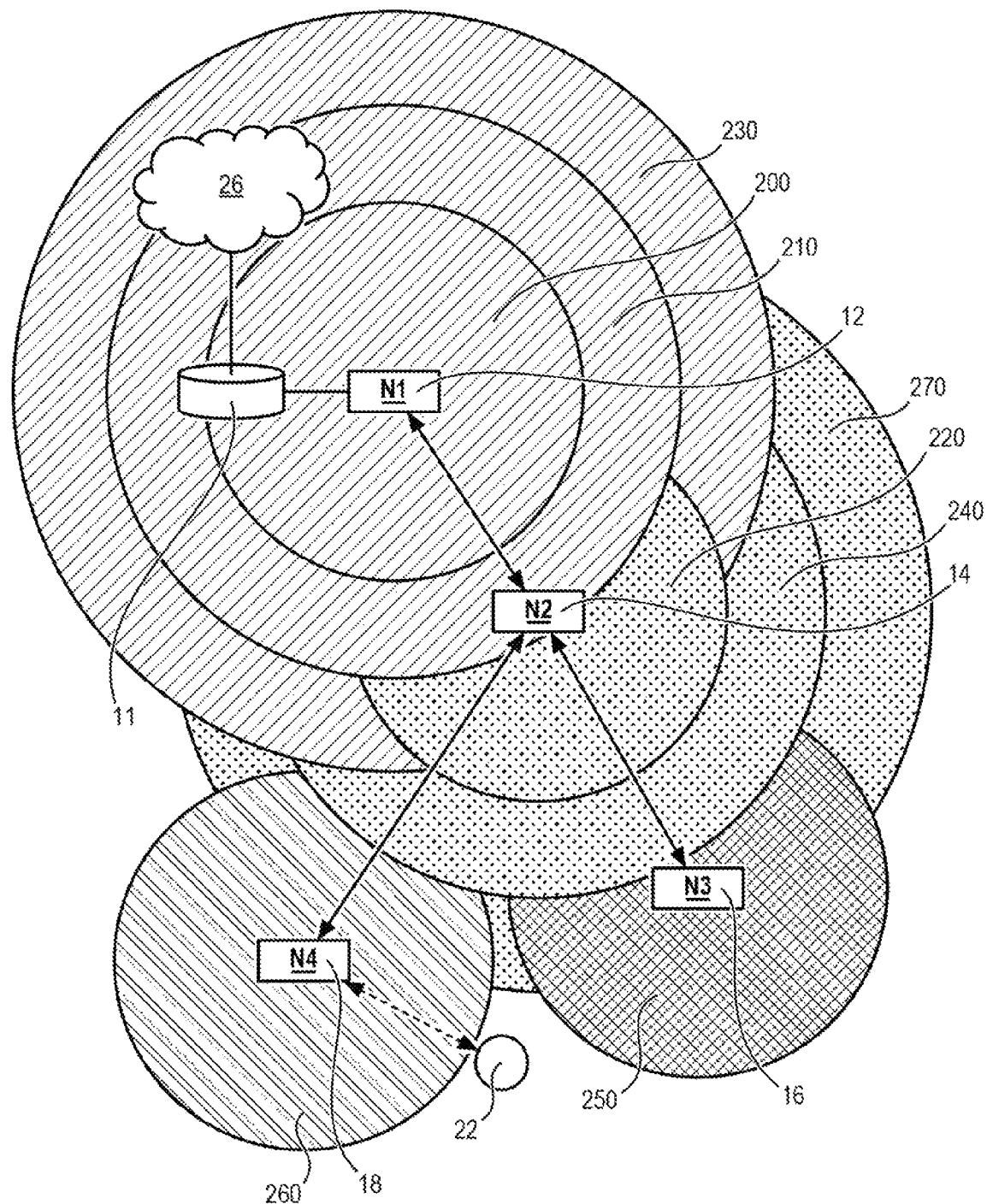

[Fig. 12]
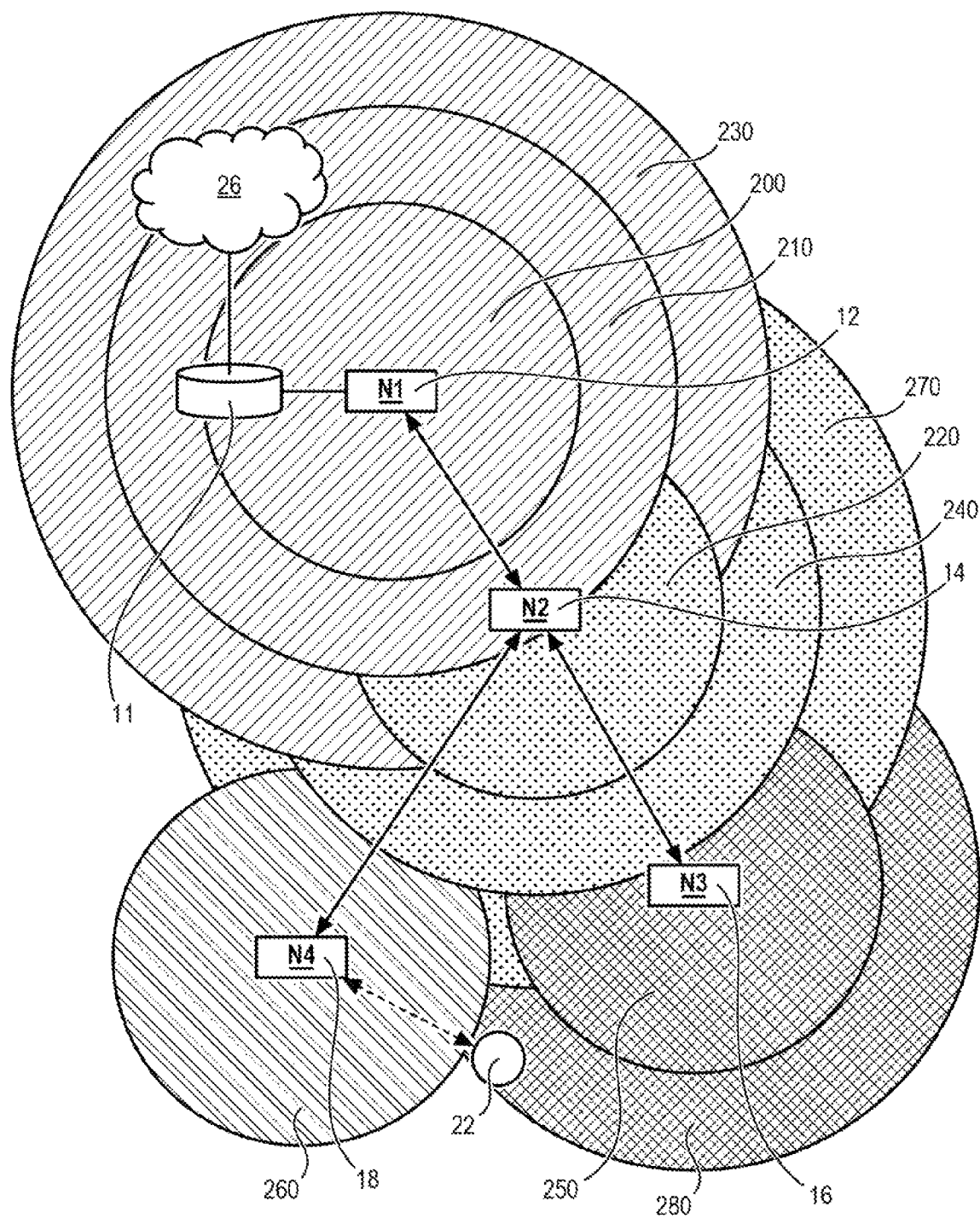

MANAGING METHOD FOR MANAGING THE CONNECTION OF A USER EQUIPMENT ITEM TO A DISTRIBUTED WIRELESS COMMUNICATION NETWORK

CROSS REFERENCE TO RELATED APPLICATIONS

The benefit of priority to French Patent Application No. 2206689, filed Jun. 30, 2022, is hereby claimed and the disclosure is incorporated herein by reference in its entirety.

FIELD OF THE INVENTION

This invention relates to the management of the connections of user equipment items to distributed wireless communication networks, more specifically to distributed wireless communication networks in accordance with one of the IEEE 802.11 (Institute of Electrical and Electronics Engineers) standards, commonly known as "Wi-Fi".

TECHNOLOGICAL BACKGROUND

A wireless communication network (hereinafter "network") in accordance with one of the IEEE 802.11 standards typically comprises a plurality of nodes. Each node is an electronic device comprising as a minimum a radio frequency module allowing the setting-up of wireless communications in accordance with one of the IEEE 802.11 standards, or in other words, in accordance with one of the Wi-Fi standards. Such a network typically comprises an access (or backhaul) node, commonly called the Access Point (AP) and a plurality of client nodes, also called "user nodes", "client equipment items", "user equipment items" or "stations", which can set up wireless connections with the access node and/or between them. In a residential environment, the access node is typically integrated into a "box" supplied by an Internet operator, i.e. an item of equipment also incorporating a home gateway or residential gateway for connecting the Wi-Fi network to a Wide Area Network or WAN, typically the Internet. The user equipment items are typically computers, televisions, tablets or smartphones. It is thus commonly said that user electronic devices are associated or connected "by Wi-Fi" with the access node.

The architecture of a Wi-Fi network can also be a so-called distributed architecture, in order for example to extend the range of the wireless network or increase its performance, by the use of a plurality of access nodes. The architecture of a distributed Wi-Fi network typically comprises two networks:
- a first so-called backhaul network, making it possible to connect access nodes to one another and to form a network infrastructure according to a network of mixed star and/or daisy chain type, this backhaul network being able to be a wireless network (for example Wi-Fi), a wired network (for example Ethernet) or a mixture of the two, and
- a second so-called user (or client) fronthaul network allowing a wireless connection of the user equipment items to the distributed Wi-Fi network.

In such a distributed wireless network, a user equipment item may find itself in a situation where it is within the signal range of several access nodes and can therefore set up a wireless connection with each of these access nodes. In such a situation, the user equipment item seeks by default to set up a wireless connection with the access node, the radio signal of which is received with the highest power by the client node, which is not always the optimal choice from the point of view of the distributed communication network. The access node chosen by the user equipment item to connect itself can indeed be the one offering the best reception quality of the radio signal, but this access node can also be overloaded in terms of the number of user equipment items already connected or of backhaul traffic passing through this node. In this situation it could be optimal for the user equipment item to connect to another access node that is less busy, even if the latter theoretically offers a lower quality of radio signal.

To palliate this lack of "handover"-type functionality in a communication network of Wi-Fi type, solutions have been proposed and are for example described in the documents FR 3 083 409 and FR 3 086 826 to force a user equipment item to connect to an access node chosen by a managing node of the distributed wireless communication network. In these known solutions, the arbitration carried out by the managing node to designate the access node to which the user equipment item must connect typically relies on a shortest path calculation algorithm, such as for example Dijkstra's algorithm, in which each user link (between the user equipment item and an access node) and each backhaul path (between the access node and a root node typically formed by the home gateway) is characterized by a weight representative of the quality or of the preference given to said link/path. However, according to their dimensioning, the weight associated with the backhaul paths are either excessively or insufficiently penalizing in relation to the weight associated with the user links.

SUMMARY OF THE INVENTION

A subject of the invention is to improve the determination of the access node to which a user equipment item can connect in the context of a distributed wireless network.

For this purpose, the subject of the invention is, according to a first aspect, a method for managing the connection of a user equipment item to a distributed wireless communication network, said distributed wireless communication network comprising a root node, a plurality of access nodes each able to set up a wireless connection with the user equipment item, and a backhaul network for conveying data between the root node and the access nodes, the managing method comprising the following steps:
 a) sorting the access nodes into different groups as a function of a primary indicator representative of their quality of connection to the root node, each group containing access nodes having primary indicators similar to one another,
 b) selecting a first group from among said groups, and for at least one access node included in the selected group:
 c) determining a secondary indicator associated with said access node, said secondary indicator being representative of a quality of connection of the user equipment item to the access node,
 d) comparing the secondary indicator to a threshold, and if the secondary indicator is less than or equal to the threshold:
 e) designating the access node for the connection of the user equipment item to the distributed wireless communication network,
 if, for each access node included in the selected group, the secondary indicator is strictly greater than the threshold:

f) repeating steps b) to e) with a second group containing access nodes having a quality of connection to the root node which is lower than that of the access nodes of the first group.

According to particular embodiments of the invention, the managing method according to the first aspect also has one or more of the following features, taken in isolation or in any technically possible combination(s):

each group has an associated datum representative of the quality of connection to the root node of the access nodes it contains, and the threshold is a variable threshold which varies as a function of the representative datum associated with the group to which the access node belongs;

the variable threshold is an increasing function of the quality of connection of the access nodes to the root node;

the managing method comprises the following additional steps:
  g) initializing a first counter to a first initialization value,
  h) determining the threshold, the threshold being a variable threshold which varies as a function of the first counter, and
  if, for a given value of the first counter, the secondary indicator associated with each access node of each selected group is strictly greater than the threshold:
  i) incrementing the first counter, and
  j) repeating steps h), b) to f) and i) with the incremented value of the first counter;

the managing method comprises, prior to the step i), a step m) of comparing the value of the first counter to a given maximum value, the step i) only being implemented if the value of the first counter is strictly less than the maximum value;

the managing method comprises the following additional steps:
  n) initializing a second counter to a second initialization value, and
  o) prior to the step f) of repeating steps b) to e), incrementing the second counter,
the step n) being repeated during the implementation of the step j),
the second counter being related to the representative data associated with the groups by a monotonic function such that the quality of connection of the access nodes to the root node decreases as the second counter increases, the step b) of selecting a group comprising the selection of a group, the representative datum of which is the image of the value of the second counter, by said monotonic function;

the managing method comprises, prior to the step o) of incrementing the second counter, a step p) of comparing the value of the second counter to the value of the first counter, the steps o) of incrementing the second counter and f) of repeating steps b) to e) being implemented only when the value of the second counter is strictly less than the value of the first counter, said comparing step p) being otherwise followed by the step i) of incrementing the first counter or, where applicable, by the step m) of comparing the value of the first counter to the given maximum value; and the managing method comprises, prior to the selecting step b), a step q) of comparing the variable threshold to a given maximum threshold, the steps b) to e) being implemented only when the variable threshold is strictly less than the given maximum threshold, said comparing step q) being otherwise followed by the step f) of repeating steps b) to e) or, where applicable, the step o) of incrementing the second counter or, where applicable, the step p) of comparing the value of the second counter to the value of the first counter.

Another subject of the invention is, according to a second aspect, a method for managing the connection of a user equipment item to a distributed wireless communication network, said distributed wireless communication network comprising a root node, a plurality of access nodes each able to set up a wireless connection with the user equipment item, and a backhaul network for conveying data between the root node and the access nodes, the managing method comprising the following steps:

a) sorting the access nodes into different groups as a function of a primary indicator representative of their quality of connection to the root node, each group containing access nodes having primary indicators similar to one another, b) ordering the groups as a function of the qualities of connection to the root node of the access nodes they contain and allocating an order number to each group, the order number increasing as the quality of connection of the access nodes constituting the group to the root node is degraded, c) initializing a first counter to a first initialization value, d) initializing a second counter to a second initialization value, e) comparing a variable threshold which varies as a function of the values of the first and second counters, to a given maximum threshold, if the variable threshold is strictly less than the given maximum threshold and if a non-empty group exists having an order number equal to the value of the second counter, for at least one access node included in said group:

f) determining a secondary indicator representative of a quality of connection of the user equipment item to the access node, g) comparing the secondary indicator to the variable threshold, and if the secondary indication is less than or equal to the variable threshold:

h) designating the access node for the connection of the user equipment item to the distributed wireless communication network, if, for each access node included in the group, the second indicator is strictly greater than the variable threshold, or no non-empty group exists having an order number equal to the value of the second counter, or if the variable threshold is greater than or equal to the given maximum threshold:

i) comparing the value of the second counter to the value of the first counter, and if the value of the second counter is strictly less than the value of the first counter:

j) incrementing the second counter, and k) repeating steps e) to k), if the value of the second counter is greater than or equal to the value of the first counter:

l) comparing the value of the first counter to a given maximum value; and if the value of the first counter is strictly less than the maximum value:

m) incrementing the first counter, and n) repeating steps d) to n).

According to particular embodiments of the invention, the managing method according to the first or the second aspect also has one or more of the following features, taken in isolation or in any technically possible combination(s):

each access node is sorted into a single group;

the managing method is executed by a managing node of the distributed wireless communication network;

the variable threshold is an increasing function of the value of the first counter;

the variable threshold is a decreasing function of the value of the second counter;

the variable threshold is equal to $S_B+(p-q)\times P$, where $S_B$ is a given minimum threshold, p is the value of the first counter, q is the value of the second counter, and P is a given increment;

the variable threshold is equal to $S_B+(p-q)\times P$, where $S_B$ is a given minimum threshold, p is the value of the first counter, q is the value of the second counter, and P is an increment which is a function of the value of the first counter and/or of the value of the second counter;

the increment is equal to $(p-q)\times P_0$, where $P_0$ is a given constant;

the second initialization value is equal to the first initialization value;

the secondary indicator is a function of the indication of the intensity of the signal received from the user equipment item as regards the access node;

the backhaul network comprises a plurality of links connecting the access nodes to one another and to the root node, each link directly connecting a first node from among the access nodes and the root node to a second node from among the access nodes and the root node, each access node being connected to the root node by a backhaul path formed by at least one of said links, the primary indicator being a function of the number of links forming said backhaul path or of a linear combination of quantities representative of the qualities of connection of the links forming said backhaul path;

the primary indicator is a function of a maximum bit rate measured between the access node and the root node;

each access node is sorted into a single group; and the distributed wireless communication network is in accordance with one of the IEEE 802.11 standards.

Another subject of the invention is, according to a third aspect, a managing node of a distributed wireless communication network, said distributed wireless communication network comprising a root node, a plurality of access nodes each able to set up a wireless connection with a user equipment item, and a backhaul network for conveying data between the root node and the access nodes, the managing node being configured to execute the steps of a managing method according to the first or the second aspect.

According to a particular embodiment of the invention, the managing node also has the following feature:

the distributed wireless communication network is in accordance with one of the IEEE 802.11 standards.

According to a fourth aspect, the subject of the invention is a distributed wireless communication network comprising a root node, a plurality of access nodes each able to set up a wireless connection with a user equipment item, and a backhaul network for conveying data between the root node and the access nodes, the root node and/or the access nodes comprising a managing node configured to execute the steps of a managing method according to the first or the second aspect.

According to a particular embodiment of the invention, the distributed wireless communication network also has the following feature:

the distributed wireless communication network is in accordance with one of the IEEE 802.11 standards.

According to a fifth aspect, a subject of the invention is a computer program product comprising instructions for implementing, by a processor of a managing node of a distributed wireless communication network comprising a root node, a plurality of access nodes each able to set up a wireless connection with a user equipment item, and a backhaul network for conveying data between the root node and the access nodes, a managing method according to the first or the second aspect when the computer program product is executed by the processor.

Finally, according to a sixth aspect, a subject of the invention is a recording medium readable by a managing node of a distributed wireless communication network on which is stored a computer program product as defined above.

BRIEF DESCRIPTION OF THE FIGURES

Other features and advantages of the invention will come apparent on reading the following description, given solely by way of example and with reference to the appended drawings, wherein:

FIG. 1 is a diagram of the architecture of a distributed wireless communication network according to an exemplary embodiment of the invention, FIG. 2 is a diagram of the hardware architecture of a managing node of the network of FIG. 1, FIG. 3 is a diagram illustrating a method for managing the connection of a user equipment item to the network of FIG. 1, executed by the managing node of FIG. 2, and FIGS. 4 to 12 are diagrams illustrating different iterations of a step of the method of FIG. 3 of comparison between a secondary indicator representative of a quality of connection of the user equipment item to an access node of the network of FIG. 1 and a variable threshold which varies as a function of the iteration.

DETAILED DESCRIPTION OF AN EXEMPLARY EMBODIMENT

The distributed wireless communication network 10 shown in FIG. 1 comprises a root node 11, a plurality of access nodes 12, 14, 16, 18 and a backhaul network 20. It also comprises a user equipment item 22.

The root node 11 is formed by an electronic device supplying a service intended for the user equipment item 12. In the example shown, this root node 11 is formed by a gateway 24 allowing the interconnection of the network 10 with a wide area network 26, for example the Internet. In a variant (not shown), the root node 11 is formed by an electronic device supplying another service, for example a network storage server (Network Attached Storage or NAS).

Each access node 12, 14, 16, 18 is formed by an electronic device able to set up a wireless connection with the user equipment item 22. Each access node 12, 14, 16, 18 thus manages a wireless communication user network dedicated to the connection of user equipment items such as the user equipment item 22 to the access node 12, 14, 16, 18, in a similar way to a non-distributed wireless communication network, of which it forms the access point. For this purpose, each access node 12, 14, 16, 18 comprises a radio frequency module (not shown) allowing the setting-up of wireless communications. This radio frequency module is preferably configured to allow the setting-up of wireless communications in accordance with one of the IEEE 802.11 standards, the distributed wireless communication network 10 being then in accordance with one of the IEEE 802.11 standards.

Each access node 12, 14, 16, 18 typically comprises a Wi-Fi EasyMesh™ Agent.

The backhaul network 20 is intended to convey data between the root node 11 and the access nodes 12, 14, 16, 18. It is formed by the root node 11 and the access nodes 12, 14, 16, 18 and comprises a plurality of lines 30, 32, 34, 36 connecting the access nodes 12, 14, 16, 18 to one another and to the root node 11. Each link 30, 32, 34, 36 is formed by a connection set up and active between a first node from among the access nodes 12, 14, 16, 18 and the root node 11 and a second node from among the access nodes 12, 14, 16, 18 and the root node 11, and directly connects the first node to said second node, i.e. without passing through another node. This link 30, 32, 34, 36 is wired, for example an Ethernet link, or a wireless link, for example Wi-Fi.

In the example shown, the links 30, 32, 34, 36 comprise a first link 30 connecting a first access node 12 to the root node 11, a second link 32 connecting a second access node 14 to the first access node 12, a third link 34 connecting a third access node 16 to the second access node 14, and a fourth link 36 connecting a fourth access node 18 to the second access node 14. The first link 30 is for example formed by a wired link, typically Ethernet, the other links 32, 34, 36 being formed by wireless links, typically Wi-Fi.

With each link 30, 32, 34, 36 is associated a quantity representative of a quality of connection of said link 30, 32, 34, 36. This representative quantity typically consists of the attenuation of signals over said link 30, 32, 34, 36, this attenuation of the signals being regularly measured by one of the nodes 11, 12, 14, 16, 18 connected by said link 30, 32, 34, 36. Here, this attenuation is for example negligible for the first link 30 and equal to 63 dB for the second link 32, to 70 dB for the third link 34 and to 75 dB for the fourth link 36. In a variant, this quantity is formed by the indication of the intensity of the received signal (Received Signal Strength Indication RSSI) of the link 30, 32, 34, 36 if the latter is a wireless link or the value 0 if it is a wired link. Again in a variant, this quantity consists of the maximum bit rate of said link 30, 32, 34, 36 as determined by a measurement at a given time (local bit rate test).

The backhaul network 20 defines, for each access node 12, 14, 16, 18 a backhaul path 40, 42, 44, 46 connecting the access node 12, 14, 16, 18 to the root node 11, this backhaul path 40, 42, 44, 46 being formed by at least one of the links 30, 32, 34, 36. In the example shown, this gives:
  a first backhaul path 40, formed by the sole first link 30, connecting the first access node 12 to the root node 11,
  a second backhaul path 42, formed by the first and second links 30, 32, connecting the second access node 14 to the root node 11,
  a third backhaul path 44, formed by the first, second and third links 30, 32, 34, connecting the third access node 16 to the root node 11, and
  a fourth backhaul path 46, formed by the first, second and fourth links 30, 32, 36, connecting the fourth access node 18 to the root node 11.

The second, third and fourth backhaul paths 42, 44, 46 thus form daisy chain paths composed of several links 30, 32, 34, 36.

With each backhaul path 40, 42, 44, 46 is associated a quantity representative of a quality of connection of said backhaul path 40, 42, 44, 46. This representative quantity typically consists of a maximum bit rate of data on said backhaul path 40, 42, 44, 46. This maximum bit rate is typically measured regularly by the associated access node 12, 14, 16, 18 and/or by the root node 11.

It should be noted that although, in the example shown, the root node 11 is shown as separate from the first access node 12, said nodes 11, 12 are preferably incorporated into one and the same electronic device (not shown), said electronic device comprising the functionalities of the root node 11 and of the access node 12. The first link 30 is then non-existent.

The user equipment item 22 is formed by an electronic device able to connect to any of the access nodes 12, 14, 16, 18. For this purpose, it comprises a radio frequency model (not shown) allowing the setting-up of wireless communications. This radio frequency module is preferably configured to allow the setting up of wireless communications in accordance with one of the IEEE 802.11 standards, the user equipment item 22 then being in accordance with one of the IEEE 802.11 standards. The user equipment item 22 consists for example in a computer, a television, a tablet or a smartphone.

In the example shown, the user equipment item 22 is connected by a default wireless connection 48 to the fourth access point 18.

The backhaul network 20 further comprises another managing node 50. In the example shown, this managing node 50 is incorporated into the root node 11. In a variant (not shown), the managing node 50 is incorporated into one of the access nodes 12, 14, 16, 18, for example the first access node 12, or into a dedicated electronic device. In a further variant, the managing node 50 is distributed, i.e. its functions are distributed between the different nodes 11, 12, 14, 16, 18 of the backhaul network 20.

The managing node 50 is configured to execute all or part of the steps of a method 100 (FIG. 3) for managing the connection of a user equipment item such as the item of equipment 22 to the wireless communication network 10.

For this purpose, the managing mode 50 comprises, as can be seen in FIG. 2: a processor or CPU (Central Processing Unit) 52, a memory 54 of RAM (Random Access Memory) and/or ROM (Read-Only Memory) type, and a storage module 56 of internal storage type.

The storage module 56 is for example of HDD (Hard Disk Drive) or SSD (Solid-State Drive) type, or of the external storage medium reader type, such as a SD (Secure Digital) card reader.

The processor 52 is configured to record data, or items of information, in the memory 54 or in the storage module 56 and/or read data stored in the memory 54 or in the storage module 56.

The processor 52 is configured to execute instructions loaded into the memory 54, for example based on the storage module 56. When the managing node 50 is energized, the processor 52 is able to read instructions from the memory 54 and execute them. These instructions form a computer program causing the implementation, by the processor 52, of all or part of the method 100. Thus, all or part of the method 100 can be implemented in software form by executing a set of instructions by a programmable machine, such as a DSP (Digital Signal Processor) or a microcontroller.

The functions of the managing node 50 can thus be incorporated into a node, for example a root node and/or an access node, of a wireless network in accordance with a 802.11 IEEE standard by the updating of the software, i.e. for example by updating the microprogram (firmware) of said node.

In a variant (not shown), the managing node 50 comprises a machine or a dedicated component, such as a FPGA (Field-Programmable Gate Array) or an ASIC (Application-Specific Integrated Circuit), to implement all or part of the method 100.

In the example shown, the managing node 50 also comprises a network module 58 and a radio frequency module 59.

The network 58 is for example of Ethernet type. It typically allows the connection of the managing node 50 to a local network, here the network 10, and/or the Internet.

The radio frequency module 59 is configured to set up a plurality of radio frequency interfaces, for example of access point type and/or of user type, i.e. allowing an association of the managing node 50 with a radio frequency interface of said access point of another electronic device. This radio frequency module 59 is advantageously in accordance with a so-called Wi-Fi standard, for example the IEEE 802.11ac standard and/or the IEEE 802.11ax standard.

The managing node 50 consists for example in a Wi-Fi EasyMesh™ controller.

The method 100 executed by the managing node 50 will now be described with reference to FIG. 3.

This method 100 is for example periodically executed for each of the connections of a user equipment item to the network 10 in order to regularly check whether or not it is necessary to transfer an existing connection from a user equipment item on one of the access nodes 12, 14, 16, 18 to another of the access nodes 12, 14, 16, 18. Alternatively, or complementarily, the method 100 is triggered by a given event, for example upon the connection of a new user equipment item to the network 10, or when an access node 12, 14, 16, 18 determines it is overloaded.

Here, it is imagined that the user equipment item 22 has just connected to the network 10 via the fourth access node 18 and that it is this connection (default connection 48) which triggers the implementation of the method 100.

The method 100 starts with a step 110 of creating groups of access nodes, during which the managing node 50 creates groups of access nodes. At this stage, each group of access nodes is empty but is associated with a characteristic interval specific to said group. This characteristic interval covers a part of the possible values for a first primary indicator representative of a quality of connection of the access nodes 12, 14, 16, 18 to the root node 11. The characteristic intervals associated with the different groups are such that:
they are pairwise disjoint, i.e. in mathematical language: $\forall (i,j) \in [0, N[$ with $i \neq j$, $I_i \cap I_j = \emptyset$, where N is the number of groups, $I_i$ is the characteristic interval associated with a first group and is the characteristic interval associated with a second group,
the set of characteristic intervals of the different groups covers the whole space of possible values for the first primary indicator, i.e. in mathematical language: $\cup_{i \in [0,N[} I_i = E$, where E represents the set of possible values of the first primary indicator.

Step 110 is followed by a step 112 of ordering the groups, in which the managing node 50 orders the groups as a function of their characteristic intervals. During this step, an order number is allocated to each group. If the first primary indicator is such that its value increases as the quality of connection is degraded, this order number will increase the characteristic interval associated with the group becomes longer; in other words, for any group $G_i$ with which a characteristic interval $I_i$ is associated and any group $G_j$ with which a characteristic interval $I_j$ is associated, if the values included in the interval $I_j$ are greater than the values included in the interval $I_i$, then the order number allocated to the group $G_j$ is greater than that allocated to the group $G_i$. If the first primary indicator is such that its value increases as the quality of connection improves, this order number will decrease as the characteristic interval associated with the group becomes longer; in other words, for any group $G_i$ with which a characteristic interval $I_i$ is associated and any group $G_j$ with which a characteristic interval $I_j$ is associated, if the values included in the interval $I_j$ are greater than the values included in the interval $I_i$, then the order number allocated to the group $G_j$ is less than that allocated to the group $G_i$.

The step 112 is followed by a step 120 for determining the first primary indicator for each access node 12, 14, 16, 18. During this step 120, the managing node 50 determines the first primary indicator for each access node 12, 14, 16, 18 on the basis of the stable parameters of the backhaul network 20 known to the managing node 50 or on the basis of the variable parameters measured by the access nodes 12, 14, 16, 18. For example the first primary indicator consists in the number of links 30, 32, 34, 36 forming the backhaul path 40, 42, 44, 46 associated with the access node 12, 14, 16, 18: the managing node 50 then determines the first primary indicator for each access node 12, 14, 16, 18 on the basis of this number of links 30, 32, 34, 36, of which it has knowledge. In a variant, the first primary indicator consists in, or is a function of, quantities representative of the quality of connections of the links 30, 32, 34, 36 forming the backhaul path 40, 42, 44, 46 associated with the access node 12, 14, 16, 18, for example the attenuations of signals, the RSSIs or the maximum bit rates measured, or a quantity representative of the quality of connection of the backhaul path 40, 42, 44, 46, for example a maximum bit rate measured between the access node 12, 14, 16, 18 and the root node 11: the managing node 50 then polls each access node 12, 14, 16, 18 so that it communicates to it, according to the situation, a measurement of said representative quantity for a link or for a backhaul path and it then determines the first primary indicator for each access node 12, 14, 16, 18 on the basis of the information returned by the access nodes 12, 14, 16, 18.

Step 120 is followed by a step 122 of sorting the access nodes 12, 14, 16, 18 into the different groups as a function of their first primary indicator. During this step, the managing node 50 sorts each access node 12, 14, 16, 18 in the group with which is associated the characteristic interval in which falls the first primary indicator determined for said access node 12, 14, 16, 18. Each group thus contains access nodes 12, 14, 16, 18 having similar first primary indicators and each access node 12, 14, 16, 18 is sorted into a single group. In addition, the order number of the group into which each access node 12, 14, 16, 18 is sorted will increase as the quality of connection of said access node 12, 14, 16, 18 to the root node 11 is degraded. Said order number thus constitutes a datum representative of the quality of connection to the root node 11 of the access nodes 12, 14, 16, 18 that the group contains.

Thus, in the example detailed here, the first primary indicator is formed by the number of links 30, 32, 34, 36 forming the backhaul path 40, 42, 44, 46 associated with the access node 12, 14, 16, 18. The set of possible values that this first primary indicator can take is formed by the set {1, 2, 3}. The number N of groups is set to 3 and one associates with a first group $G_0$ the characteristic interval [1, 2[, with a second group $G_1$ the characteristic interval [2, 3[ and with a third group $G_2$ the characteristic interval [3, 4[. The order number 0 is then allotted to the first group $G_0$, the order number 1 is allocated to the second group $G_1$ and the order number 2 is allocated to the second group $G_2$. Moreover, the first access node 12 is sorted into the first group $G_0$, the second access node 14 is sorted into the second group $G_1$, and the third and fourth access nodes 16, 18 are sorted into the third group $G_2$.

In the example shown, the method 100 further comprises, following the step 122, a step 124 of ordering the access nodes 12, 14, 16, 18. During this step 124, the managing node 50 orders the access nodes 16, 18 which are inside one and the same group as a function of a second primary indicator, it too representative of a quality of connection of the access nodes 12, 14, 16, 18 to the root node 11, such that the access nodes 12, 14, 16, 18 are ordered by decreasing order of their quality of connection. This second primary indicator is for example formed by, or is a function of, quantities representative of the qualities of connection of the links 30, 32, 34, 36 forming the backhaul path 40, 42, 44, 46 associated with the access node 12, 14, 16, 18, for example attenuations of signals, RSSIs or maximum bit rates measured, or a quantity representative of the quality of connection of the backhaul path 40, 42, 44, 46, for example a maximum bit rate measured between the access node 12, 14, 16, 18 and the root node 11. It is then advantageously identical to the first primary indicator. In a variant, the second primary indicator is formed by the number of links 30, 32, 34, 36 forming the backhaul path 40, 42, 44, 46 associated with the access node 12, 14, 16, 18.

In the example detailed here, the second primary indicator is formed by the signal attenuation measured between the access node 12, 14, 16, 18 and the root node 11. The signal attenuation being less for the third access node 16 than for the fourth access node 18, the third access node 16 is sorted before the fourth access node 18.

Optionally, the step 124 also includes a sub-step (not shown) of using an arbitrary indicator to order the access nodes 12, 14, 16, 18 in the event of the second primary indicators being equal in at least two access nodes 12, 14, 16, 18 of one and the same group. This arbitrary indicator is for example formed by the serial number of the access nodes 12, 14, 16, 18, the access nodes 12, 14, 16, 18 then being ordered by alphabetical order of said serial numbers.

The step 124 is followed by a step 130 of initializing a first counter. During this step 130, the managing node 50 initializes the first counter to a first initialization value $p_0$. This first initialization value $p_0$ is typically equal to 0.

The step 130 is followed by a step 132 of initializing a second counter. During this step 132, the managing node 50 initializes the second counter to a second initialization value $q_0$. This second initialization value $q_0$ is advantageously equal to the first initialization value $p_0$. It is typically equal to 0.

The second counter is related to the order numbers of the groups by a monotonic function such that the quality of connection to the root node 11 of the access nodes 12, 14, 16, 18 included in a group, the order number of which is the image of the second counter by said monotonic function decreases as the second counter increases. This monotonic function here consists in the identity function.

The step 132 is followed by a step 140 of determining a variable threshold which varies as a function of the first and second counters. This variable threshold is an increasing function of the value of the first counter. It is moreover a decreasing function of the value of the second counter. Thus, the variable threshold is function of the order numbers of the groups (insofar as the second counter is a function of said order numbers) and is an increasing function of the quality of connection of the access nodes 12, 14, 16, 18 to the root node 11 (insofar as the second counter is a decreasing function of the quality of connection of the access nodes 12, 14, 16, 18 to the root node 11).

This variable threshold is preferably equal to $S_B+(p-q)\times P$, where $S_B$ is a given minimum threshold, p is the value of the first counter, q is the value of the second counter, and P an increment which is a function of the value of the first counter and of the value of the second counter. In particular, said increment P is equal to $(p-q)\times P_0$, where $P_0$ is a given constant. In a variant, the increment P is a given increment, for example equal to 10 dB.

The given minimum threshold is for example equal to 60 dB.

The step 140 is followed by a step 142 of comparing the variable threshold to a given maximum threshold. This given maximum threshold is for example equal to 90 dB.

If the variable threshold is strictly less than the given maximum threshold, the step 142 is followed by a step 144 of checking the existence of a non-empty group having an order number equal to the value p of the second counter. Otherwise, if the variable threshold is greater than or equal to the given maximum threshold, the step 142 is followed by a step 146 of comparing the second counter to the first counter.

During the step 144, the managing node 50 checks whether or not a non-empty group exists, the order number of which is the image of the value q of the second counter by the monotonic function relating the second counter to the order numbers of the groups. Here, this equates to checking whether or not a non-empty group exists having an order number equal to the value q of the second counter. If this is the case, the step 144 is followed by a step 148 of selecting said group. Otherwise, the step 144 is followed by the step 146 of comparing the second counter to the first counter.

During the step 148, the managing node 50 selects the non-empty group, the order number of which is the image of the value q of the second counter by the monotonic function relating the second counter to the order numbers of the groups. The variable threshold is thus a function of the order number of the selected group.

The step 148 is followed by a step 150 of selecting an access node 12, 14, 16, 18 of said group.

During the step 150, the managing node 50 selects in the selected group an access node 12, 14, 16, 18 of said group, in the order determined during step 124. In other words, the managing node 50 selects, from among the as yet unselected access nodes 12, 14, 16, 18 of the group during this iteration of the first counter, the one that has the best second primary indicator.

The step 150 is followed by a step 152 of determining a secondary indicator representative of a quality of connection of the user equipment item 22 to the selected access node 12, 14, 16, 18. This secondary indicator is typically a function of, and is for example formed by the Received Signal Strength Indication or RSSI of the user equipment item 22 for the selected access node 12, 14, 16, 18. During this step, the managing node 50 typically asks the selected access node 12, 14, 16, 18 to communicate to it a measurement of this RSSI and determines the secondary indicator as a function of the reply of the selected access node 12, 14, 16, 18.

The method 100 further comprises, after the step 152, a step 154 of comparing the secondary indicator to the variable threshold. If the secondary indicator is less than or equal to the variable threshold, the step 154 is followed by a step 156 of designating the selected access node 12, 14, 16, 18 for the connection of the user equipment item 22 to the distributed wireless communication network 10, and the method 300 terminates. The managing node 50 can then force the user equipment item to set up a connection with the designated access node 12, 14, 16, 18 using for example one of the techniques described in the documents FR 3 083 409 and FR 3 086 826. Otherwise, if the secondary indicator is strictly greater than the variable threshold, the step 154 is followed by a step 158 of checking whether or not another access node 12, 14, 16, 18 exists in the group having an order number equal to the value q of the second counter.

During the step 158, the managing node 50 checks whether or not there exists in the group having an order number equal to the value q of the second counter at least one access node 12, 14, 16, 18 which has not yet been selected during this iteration on the first counter. If such is the case, the method 100 returns to the step 150 to select the access node 12, 14, 16, 18 in the sorting order internal to said group, such as to repeat the steps 152 to 156 with this new node. Otherwise, the step 158 is followed by the step 146 of comparing the second counter to the first counter.

During the step 146, the managing node 50 compares the value q of the second counter to the value p of the first counter. If the value q is strictly less than the value p, the step 146 is followed by a step 160 of incrementing the second counter. Otherwise, the step 146 is followed by a step 162 of comparing the first counter to a given maximum value.

During the step 160, the managing node 50 increments the second counter. Following this step 160, the method returns to the step 140 of determining the variable threshold, such as to update the value of the variable threshold as a function of the incremented value of the second counter and repeat the steps 142 to 158 with this updated value.

During the step 162, the managing node 50 compares the value p of the first counter to the given maximum value. This maximum value is typically equal to the number N of groups of access nodes. If the value p is strictly less than this maximum value, the step 162 is followed by a step 164 of incrementing the first counter. Otherwise, the step 162 is followed by a step 166 of ending the method 300 and of maintaining the default connection.

During the step 164, the managing node 50 increments the first counter. Following this step 164, the method returns to the step 132 of initializing the second counter, such as to reset the second computer then update the value of the variable threshold during the step 140 as a function of the incremented value of the first counter and repeat the steps 142 to 162 with this updated value.

The practical implementation of this method 100 in the context of the example detailed here will now be described with reference to FIGS. 4 to 12.

During the first iteration of the steps 132 to 162, the value of the first counter is 0 and the value of the second counter is 0. The variable threshold is thus equal to the minimum threshold, i.e. 60 dB, and is therefore less than the maximum threshold. The first access point 12 included in the first group $G_0$ having an order number equal to the value of the second counter is therefore selected and the RSSI of the user equipment item 22 is compared as regards the first access point 12 to the variable threshold, symbolized in FIG. 4 by the sphere 200 delimiting the area of the space inside which the RSSIs of the user equipment items as regards the first access point 12 is less than the variable threshold. Since the user equipment item 22 is outside this sphere 200, the step 156 is not implemented. Since the first access point 12 is the only access point included in the first group $G_0$, the step 154 is not repeated for another access point, and since the second counter is equal to the first counter, the second counter is not incremented. The method 100 therefore goes directly to the step 164 of incrementing the first counter for a second iteration of the steps 132 to 162.

During this second iteration of the steps 132 to 162, the value of the first counter is 1. The value of the second counter, meanwhile, is initially 0. The variable threshold is thus initially equal to the minimum threshold $S_B$ increased by the increment P, or 70 dB, and is therefore less than the maximum threshold. The first access point 12 included in the first group $G_0$ having an order number equal to the value of the second counter is therefore selected and the RSSI of the user equipment item 22 as regards the first access point 12 is compared to the variable threshold, symbolized on FIG. 5 by the sphere 210 delimiting the area of the space inside which the RSSIs of the user equipment items as regards the first access point 12 is less than the variable threshold. Since user equipment item 22 is then outside this sphere 210, the step 156 is not implemented. Since the first access point 12 is the only access point included in the first group $G_0$, the step 154 is not repeated for another access point.

Since the second counter is less than the first counter, the second counter is then incremented. The method 100 therefore returns to the step 140 with the first counter equal to 1 and the second counter also equal to 1. The variable threshold is thus equal to the minimum threshold $S_B$ i.e. 60 dB, and is therefore less than the maximum threshold. The second access point 14 included in the second group $G_1$ having an order number equal to the value of the second counter is therefore selected and the RSSI of the user equipment item 22 as regards the second access point 14 is compared to the variable threshold, symbolized in FIG. 6 by the sphere 220 delimiting the area of the space inside which the RSSI of the user equipment items as regards the second access point 14 is less than the variable threshold. Since the user equipment item 22 is outside this sphere 220, the step 156 is not implemented. Since the second access point 14 is the only access point included in the second group $G_1$, the step 154 is not repeated for another access point, and since the second counter is equal to the first counter, it is not further incremented. The method 100 thus goes directly to the step 164 of incrementing the first counter for a third iteration of the steps 132 to 162.

During this third iteration of the steps 132 to 162, the value of the first counter is 2. The value of the second counter, meanwhile, is initially 0. The variable threshold is thus initially equal to the minimum threshold $S_B$ increased by twice the increment P, i.e. 80 dB, and is therefore less than the maximum threshold. The first access point 12 included in the first group $G_0$ having an order number equal to the value of the second counter is therefore selected and the RSSI of the user equipment item 22 as regards the second access point 12 is compared to the variable threshold, symbolized in FIG. 7 by the sphere 230 delimiting the area of the space inside which the RSSI of the user equipment items as regards the second access point 12 is less than the variable threshold. Since the user equipment item 22 is outside this sphere 230, the step 156 is not implemented. Since the first access point 12 is the only access point included in the first group $G_0$, the step 154 is not repeated for another access point.

Since the second counter is less than the first counter, the second counter is then incremented. The method 100 then returns to the step 140 with the first counter equal to 2 and the second counter equal to 1. The variable threshold is thus equal to the minimum threshold $S_B$ increased by the increment P, i.e. 70 dB, and is therefore less than the maximum threshold. The second access point 14 included in the second group $G_1$ having an order number equal to the value of the second counter is therefore selected and the RSSI of the user equipment item 22 as regards the second access point 14 is compared to the variable threshold, symbolized in FIG. 8 by the sphere 240 delimiting the area of the space inside which the RSSI of the user equipment items as regards the second access point 14 is less than the variable threshold. Since the user equipment item 22 is outside this sphere 240, the step 156 is not implemented. Since the second access point 14 is the only access point included in the second group $G_1$, the step 154 is not repeated for another access point.

Since the second counter is still less than the first counter, the second counter is then incremented. The method 100 thus returns to step 140 with the first counter equal to 2 and the second counter also equal to 2. The variable threshold is thus equal to the minimum threshold $S_B$ i.e. 60 dB, and is therefore less than the maximum threshold. Since the third access point 16 is the access point having the higher order number in the third group $G_2$ which has an order number equal to the value of the second counter, it is selected and the RSSI of the user equipment item 22 as regards the third point of access 16 is compared to the variable threshold, symbolized in FIG. 9 by the sphere 250 delimiting the area of the space inside which the RSSI of the user equipment items as regards the third access point 16 is less than the variable threshold. Since the user equipment item 22 is outside this sphere 220, the step 156 is not implemented.

Since the fourth access point 18 is also included in the third group $G_2$, the step 154 is repeated for this other access point. The RSSI of the user equipment item 22 as regards the fourth access point 18 is compared to the variable threshold, symbolized in FIG. 10 by the sphere 260 delimiting the area of the space inside which the RSSI of the user equipment items as regards the fourth access point 18 is less than the variable threshold. Since the user equipment item 22 is outside this sphere 260, the step 156 is not implemented.

Since the third group $G_2$ does not comprise any other access points, the step 154 is not repeated again. In addition, since the second counter is now equal to the first counter, it is not further incremented. The method 100 will thus go directly to the step 164 of incrementing the first counter for a fourth iteration of steps 132 to 162.

During this fourth iteration of the steps 132 to 162, the value of the first counter is 3. The value of the second counter, meanwhile, is initially 0. The variable threshold is thus initially equal to the minimum threshold $S_B$ increased by three times the increment P, i.e. 90 dB, and is therefore equal to the maximum threshold. The method 100 thus goes directly to the step 160 of incrementing the second counter, without comparing the RSSI of the user equipment item 22 as regards the first access point 12 to the variable threshold.

The method 100 thus returns to the step 140 with the first counter equal to 3 and the second counter equal to 1. The variable threshold is thus equal to the minimum threshold $S_B$ increased by twice the increment P, i.e. 80 dB, and is therefore less than the maximum threshold. The second access point 14 included in the second group $G_1$ having an order number equal to the value of the second counter is therefore selected and the RSSI of the user equipment item 22 as regards the second access point 14 is compared to the variable threshold, symbolized in FIG. 11 by the sphere 270 delimiting the area of the space inside which the RSSI of the user equipment items as regards the second access point 14 is less than the variable threshold. Since the user equipment item 22 is outside this sphere 270, the step 156 is not implemented. Since the second access point 14 is the only access point included in the second group $G_1$, the step 154 is not repeated for another access point.

Since the second counter is still less than the first counter, the second counter is incremented again. The method 100 thus returns to the step 140 with the first counter equal to 3 and the second counter equal to 2. The variable threshold is thus equal to the minimum threshold $S_B$ incremented by the increment P, i.e. 70 dB, and is therefore less than the maximum threshold. Since the third access point 16 is the access point having the highest order number in the third group $G_2$ that has an order number equal to the value of the second counter, it is selected and the RSSI of the user equipment item 22 as regards the third access point 16 is compared to the variable threshold, symbolized on FIG. 12 by the sphere 280 delimiting the area of the space inside which the RSSI of the user equipment items as regards the third access point 16 is less than the variable threshold. Since the user equipment item 22 is included in this sphere 220, the third access point 16 is designated for the connection of the user equipment item 22 and the method 300 terminates. The user equipment item 22 must therefore cut its default connection 48 with the fourth access point 18 and set up a new connection with the third access point 16.

Using the embodiments described above, it is thus possible to very efficiently optimize the connection of the user equipment items to the distributed wireless communication network 10 in such a way as to maximize the quality of the connection of these user equipment items.

The invention claimed is:

1. A managing method for managing the connection of a user equipment item to a distributed wireless communication network, said distributed wireless communication network comprising a root node, a plurality of access nodes each able to set up a wireless connection with the user equipment item, and a backhaul network for conveying data between the root node and the access nodes, the managing method comprising the following steps:
   a) sorting the access nodes into different groups as a function of a primary indicator representative of a quality of connection of each access node to the root node, each group containing access nodes having primary indicators included in a characteristic interval associated with the group and distinct from the characteristic interval associated with each other group,
   b) selecting a first selected group from among said groups, and
   for at least one candidate access node included in the first selected group:
   c) determining a secondary indicator associated with said candidate access node, said secondary indicator being representative of a quality of connection of the user equipment item to the access node,
   d) comparing the secondary indicator to a threshold, and if the secondary indicator is less than or equal to the threshold:
   e) designating the candidate access node for the connection of the user equipment item to the distributed wireless communication network,
   if, for each access node included in the first selected group, the secondary indicator is strictly greater than the threshold:
   f) repeating steps b) to e) with a second selected group containing access nodes having a quality of connection to the root node which is lower than the quality of connection to the root node of the access nodes of the first selected group.

2. The managing method as claimed in claim 1, wherein each group has an associated representative datum representative of a mean quality of connection to the root node of the access nodes it contains, and the threshold is a variable threshold which varies as a function of the representative datum associated with the group to which the candidate access node belongs.

3. The managing method as claimed in claim 2, wherein the variable threshold is an increasing function of the mean quality of connection to the root node.

4. The managing method as claimed in claim 1, comprising the following additional steps:
   g) initializing a first counter to a first initialization value,
   h) determining the threshold, the threshold being a variable threshold which varies as a function of a value of the first counter, and
      if, for a given value of the first counter, the secondary indicator associated with each access node of each selected group is strictly greater than the threshold:
   i) incrementing the first counter so that the first counter has an incremented value, and
   j) repeating steps h), b) to f) and i) with the incremented value of the first counter.

5. The managing method as claimed in claim 4, comprising, prior to the step i), a step m) of comparing the value of the first counter to a given maximum value, the step i) only being implemented if the value of the first counter is strictly less than the maximum value.

6. The managing method as claimed in claim 4, comprising the following additional steps:
   n) initializing a second counter to a second initialization value, and
   o) prior to the step f), incrementing the second counter, the step j) including repeating step n),
   each group having an associated representative datum representative of a mean quality of connection to the root node of the access nodes it contains, the second counter being related to the representative data associated with the groups by a monotonic function such that the mean quality of connection to the root node decreases as the second counter increases, the step b) comprising selecting a group, the representative datum of which is the image of a current value of the second counter by said monotonic function.

7. The managing method as claimed in claim 6 comprising, prior to the step o), a step p) of comparing the value of the second counter to the value of the first counter, the steps o) and f) being implemented only when the value of the second counter is strictly less than the value of the first counter, said step p) being otherwise followed by the step i).

8. The managing method as claimed in claim 6, wherein the variable threshold is an increasing function of the value of the first counter.

9. The managing method (100) as claimed in claim 2, comprising, prior to the step b), a step q) of comparing the variable threshold to a given maximum threshold, the steps b) to e) being implemented only when the variable threshold is strictly less than the given maximum threshold, said comparing step q) being otherwise followed by the step f).

10. The managing method as claimed in any of the preceding claims, wherein each access node is sorted into a single group.

11. The managing method as claimed in any of the preceding claims, executed by a managing node of the distributed wireless communication network.

12. A managing node of a distributed wireless communication network, said distributed wireless communication network comprising a root node, a plurality of access nodes each able to set up a wireless connection with a user equipment item, and a backhaul network for conveying data between the root node and the access nodes, the managing node being configured to execute the steps of the managing method as claimed in claim 1.

13. A distributed wireless communication network comprising a root node, a plurality of access nodes each able to set up a wireless connection with a user equipment item, and a backhaul network for conveying data between the root node and the access nodes, the root node and/or the access nodes comprising a managing node claim 12.

14. A non-transitory computer-readable medium comprising a computer program product comprising code instructions for the execution of the managing method as claimed in claim 1.

15. The managing method as claimed in claim 6 comprising the following additional steps:
   prior to the step i), a step m) of comparing the value of the first counter to a given maximum value, the step i) only being implemented if the value of the first counter is strictly less than the maximum value,
   prior to the step o), a step p) of comparing the value of the second counter to the value of the first counter, the steps o) and f) being implemented only when the value of the second counter is strictly less than the value of the first counter, said step p) being otherwise followed by the step m).

16. The managing method as claimed in claim 4, comprising, prior to the step b), a step q) of comparing the variable threshold to a given maximum threshold, the steps b) to e) being implemented only when the variable threshold is strictly less than the given maximum threshold, said comparing step q) being otherwise followed by the step f) or, where applicable, the step o) of incrementing the second counter or, where applicable, the step p) of comparing the value of the second counter to the value of the first counter.

17. The managing method as claimed in claim 6, comprising, prior to the step b), a step q) of comparing the variable threshold to a given maximum threshold, the steps b) to e) being implemented only when the variable threshold is strictly less than the given maximum threshold, said comparing step q) being otherwise followed by the step o).

18. The managing method as claimed in claim 7, comprising, prior to the step b), a step q) of comparing the variable threshold to a given maximum threshold, the steps b) to e) being implemented only when the variable threshold is strictly less than the given maximum threshold, said comparing step q) being otherwise followed by the step p).

* * * * *